(12) United States Patent
Boterdaele et al.

(10) Patent No.: US 8,840,123 B2
(45) Date of Patent: Sep. 23, 2014

(54) DOUBLE-DECKER COACH

(71) Applicant: Van Hool NV, Lier (BE)

(72) Inventors: Heli Boterdaele, Waasmunster (BE); Leon De Wit, Schoten (BE)

(73) Assignee: Van Hool NV, Lier (Koningshooikt) (BE)

( * ) Notice: Subject to any disclaimer, the term of this patent is extended or adjusted under 35 U.S.C. 154(b) by 0 days.

(21) Appl. No.: 14/016,595

(22) Filed: Sep. 3, 2013

(65) Prior Publication Data

US 2014/0062043 A1   Mar. 6, 2014

(30) Foreign Application Priority Data

Sep. 4, 2012   (BE) .................................. 2012/0574

(51) Int. Cl.
| | | |
|---|---|---|
| *B62D 13/02* | (2006.01) | |
| *B62D 31/04* | (2006.01) | |
| *B60G 3/20* | (2006.01) | |
| *B62D 47/02* | (2006.01) | |
| *B62D 31/02* | (2006.01) | |

(52) U.S. Cl.
CPC ............ *B62D 31/04* (2013.01); *B60G 2300/14* (2013.01); *B60G 2200/144* (2013.01); *B60G 3/20* (2013.01); *B62D 47/02* (2013.01); *B62D 31/02* (2013.01)
USPC ........................... 280/81.6; 280/104; 280/676

(58) Field of Classification Search
USPC ................. 280/86.1, 104, 676, 81.6
See application file for complete search history.

(56) References Cited

U.S. PATENT DOCUMENTS

| | | | |
|---|---|---|---|
| 2,415,460 A | | 2/1947 | Caesar |
| 4,181,189 A | * | 1/1980 | Hobbensiefken ............... 180/11 |
| 4,469,369 A | * | 9/1984 | Belik et al. .................... 296/178 |
| 5,678,883 A | | 10/1997 | Bittner et al. |
| 6,062,801 A | * | 5/2000 | Cooper ......................... 414/470 |
| 6,085,853 A | * | 7/2000 | Wernick ..................... 180/24.09 |

(Continued)

FOREIGN PATENT DOCUMENTS

DE   10 2007 028282 A1   1/2009

OTHER PUBLICATIONS

Belgian Search Report for Belgian Patent Application No. BE 201200574, issued on Apr. 16, 2013.

*Primary Examiner* — Toan To

(74) *Attorney, Agent, or Firm* — Knobbe, Martens, Olson & Bear LLP

(57) ABSTRACT

A double-decker coach is described which includes a frame, an engine, a front axle and a tandem rear axle. The front axle lies transversely to the principal axis of the frame and offers support to the frame. The front axle includes a pair of steerable wheels, which lie mounted on bearings. The pair of wheels can be steered by a driver. The tandem rear axle lies transversely to the longitudinal direction of the frame and is mounted parallel to the front axle and offers support to the aforesaid frame. The tandem rear axle includes a drive axle and a trailing axle. The drive axle includes two pairs of drive wheels. The drive axle is coupled to the engine. The trailing axle is mounted parallel to the drive axle and includes two pairs of trailing wheels. The ratio of the distance (C) between the third axle and the rear end of the double-decker coach relative to the mutual distance (B) between the front axle and the trailing axle is between 0.20 and 0.50, preferably 0.25 and 0.45, more preferably 0.35 to 0.42, and most preferably approximately 0.39.

15 Claims, 11 Drawing Sheets

(56) References Cited

U.S. PATENT DOCUMENTS

| | | | |
|---|---|---|---|
| 6,789,639 B2 * | 9/2004 | Uranaka et al. | 180/245 |
| 6,830,417 B2 * | 12/2004 | Deets | 410/4 |
| 7,118,513 B2 * | 10/2006 | Stummer | 477/2 |
| 7,954,576 B2 * | 6/2011 | Brathe et al. | 180/24.04 |
| 2006/0049670 A1 | 3/2006 | Beaudry et al. | |
| 2009/0166106 A1 | 7/2009 | Batdorf | |
| 2009/0224570 A1 | 9/2009 | Haswell et al. | |
| 2011/0121554 A1 | 5/2011 | Olson et al. | |

* cited by examiner

DOUBLE-DECKER COACH

TECHNICAL FIELD

The present invention relates to an improved double-decker coach.

BACKGROUND

A double-decker coach is a coach having two passenger compartments situated one above the other. The advantage of the use of two compartments is that more persons can be transported at the same time. Where about 50 persons may be transported in a normal coach, the capacity of a double-decker is about 80 persons, whilst there is no increase in the number of coach personnel. Transport with a double-decker can hence be more efficient, because the length and manoeuvrability conform to that of a single-decker coach.

Nowadays, double-deckers are also used in the tourist industry. Generally, the bottommost passenger compartment does not then occupy the entire length of the coach and the rearmost part thereof is used as luggage space.

A problem with the known double-decker coaches is the comfort and safety of the passengers.

Document U.S. Pat. No. 2,415,460 from the prior art relates to a motor vehicle having a front axle and a tandem rear axle with double-mounted tyres. In the illustrations, the vehicle in question is a double-decker coach.

Document US 2009/0166106 A1 from the prior art relates to a vehicle having a front axle and a tandem rear axle with double-mounted tyres. The wheels of the drive axle are not independently suspended.

There is a need for better comfort for passengers, for safer, more easily steerable double-decker coaches, which at the same time cause less damage to the road surface.

The object of the present invention is an improved double-decker coach which offers a solution to at least one of the aforementioned drawbacks associated with known double-decker coaches, as is described by the characterizing part of claim 1.

SUMMARY OF THE INVENTION

The invention relates in particular to a double-decker coach (1) comprising:
- a frame (9);
- an engine (5);
- a front axle (2), which lies transversely to the principal axis of said frame (9) and which offers support to the aforesaid frame (9), wherein said front axle (2) comprises a pair of steerable wheels (6), which lie mounted on bearings, and wherein said pair of wheels (6) can be steered by a driver;
- a tandem rear axle, which lies transversely to the longitudinal direction of said frame, which is mounted parallel to said front axle (2) and which offers support to the aforesaid frame (9), and wherein said tandem rear axle comprises a drive axle (3) and a trailing axle (4), wherein the drive axle (3) comprises two pairs of drive wheels (7), wherein said drive axle (3) is coupled to said engine (5), and wherein the trailing axle (4), which is mounted parallel to the drive axle (3), comprises two pairs of trailing wheels (8), wherein the ratio of the distance (C) between the third axle and the rear end of the double-decker coach (1) relative to the mutual distance (B) between the front axle and the trailing axle (4) is between 0.2 and 0.5, preferably approximately 0.39.

Further preferred embodiments are set out in the subclaims.

DESCRIPTION OF THE FIGURES

The accompanying FIGS. 1 to 12 show preferred embodiments of the invention.

FIG. 1 shows a side view and a top view of the chassis of the double-decker coach (1).

FIG. 2 shows a side and top view of the steering system of the double-decker coach (1).

FIG. 3 shows a top view of, on the one hand, the front axle (2), wherein the steerable wheels (6, 6a, 6b) are turned maximally to the right, and, on the other hand, the front axle (2), wherein the steerable wheels (6, 6a, 6b) are turned maximally to the left.

FIG. 4 shows some front views, top views and a side view of possible positions of the track arms (19), track rods (11) and steering rockers (12) of the front axle (2).

FIG. 5 shows a front view and a top view of the suspension of the front axle (2).

FIG. 6 shows a front view of a section of the front axle (2), wherein this is decompressed on the one hand, and is compressed on the other hand FIG. 7 shows a rear view and a top view of the drive axle (3).

FIG. 8 shows a rear view of a section of the drive axle (3), wherein this, on the one hand, is compressed and, on the other hand, is decompressed.

FIG. 9 shows a side view and a top view of the trailing axle (4).

FIG. 10 shows a cross-sectional view of an air bellow (10).

FIG. 11 shows side views and top views of various possible configurations of the double-decker coach.

DETAILED DESCRIPTION

Figure 1:
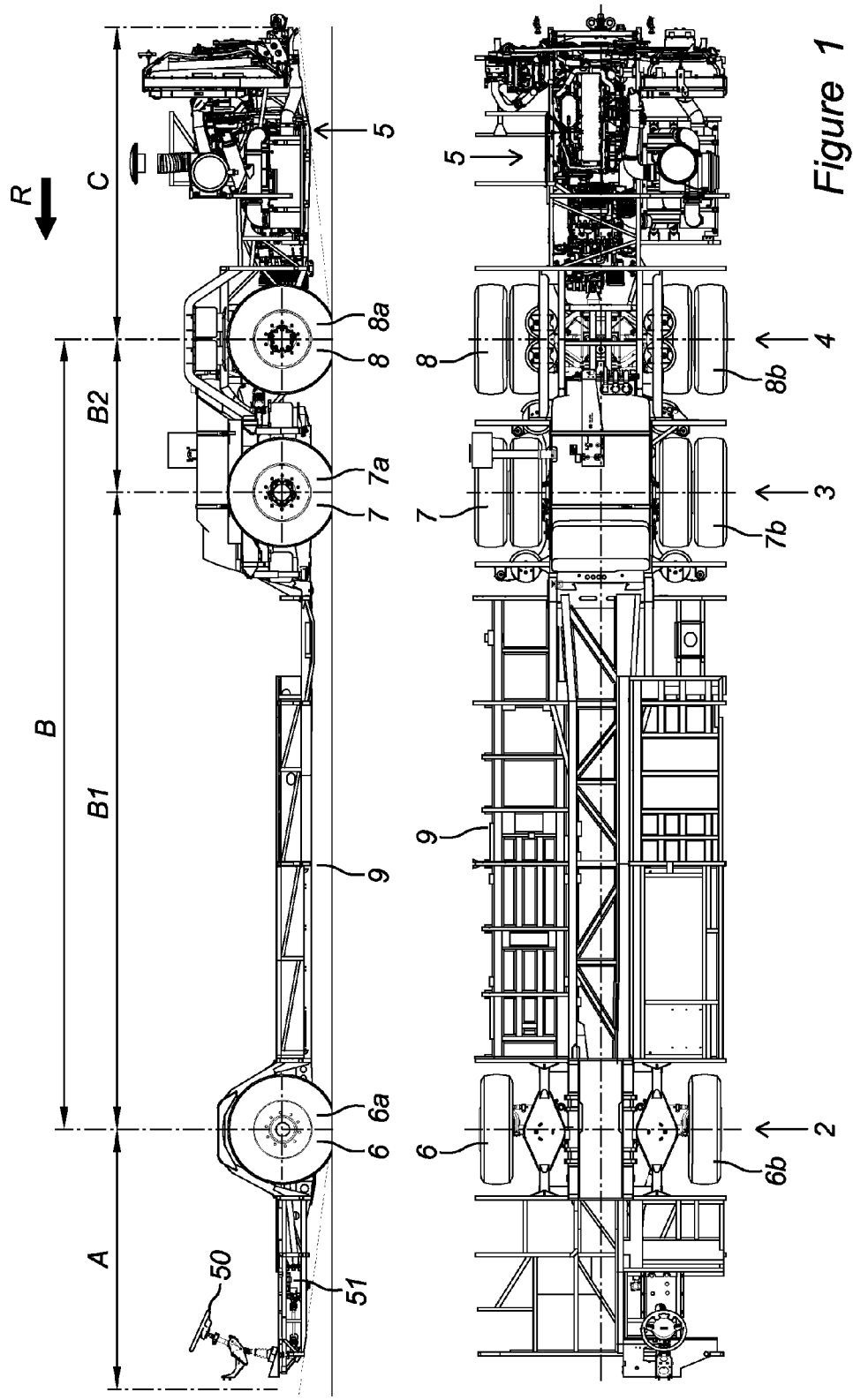

"A" and "the" refer in this document to both singular and plural unless the context clearly implies otherwise. For example, "a brake block" denotes one or more than one brake block.

The terms "comprise", "comprising", "consist of", "consisting of", "provided with", "contain", "containing", "include", "including", "implies", "implying" are synonyms and are inclusive or open terms that indicates the presence of that which follows, and which do not exclude or preclude the presence of other components, characteristics, elements, parts, steps, known from or described in the prior art.

The citing of numerical ranges by use of the end points comprises all whole numbers, fractions and/or real numbers between the end points, including these end points.

When in this document "approximately" or "about/around" is used with a measurable quantity, a parameter, a duration or moment, and such like, then variations of +/−20% or less are to be understood as, preferably +/−10% or less, preferably more by +/−5% or less, even more preferably by +/−1% or less, and even more preferably +/−0.1% or less than and of the quoted value, in so far such variations are applicable to the invention as described. Here it should however be understood that the value of the quantity whereby the term "approximately" or "about/around" is used, is itself specifically indicated.

Where a "distance" between two "axles" is used in this document, then the distance between the middles of these axles is meant, wherein the direction of these axles is perpendicular to the longitudinal direction of the coach.

In a first aspect, the invention relates to a double-decker coach (1) comprising:
- a frame (9);
- an engine (5);
- a front axle (2), which lies transversely to the principal axis of said frame (9) and which offers support to the aforesaid frame (9), wherein said front axle (2) comprises a pair of steerable wheels (6), which lie mounted on bearings, and wherein said pair of wheels (6) can be steered by a driver;
- a tandem rear axle, which lies transversely to the longitudinal direction of said frame, which is mounted parallel to said front axle (2) and which offers support to the aforesaid frame (9), and wherein said tandem rear axle comprises a drive axle (3) and a trailing axle (4), wherein the drive axle (3) comprises two pairs of drive wheels (7), wherein said drive axle (3) is coupled to said engine (5), and wherein the trailing axle (4), which is mounted parallel to the drive axle (3), comprises two pairs of trailing wheels (8), wherein the ratio of the distance (C) between the third axle and the rear end of the double-decker coach (1) relative to the mutual distance (B) between the front axle and the trailing axle (4) is between 0.2 and 0.5, preferably 0.25 and 0.45, more preferably 0.35 to 0.42, and most preferably approximately 0.39.

This has the advantage of increasing the road safety for the coach passengers and third parties, by virtue of an optimal ratio of the distance between the rearmost axle and the rear end of the coach and the mutual distance between the front axle and the rearmost axle. This also has the advantage that the comfort of the passengers is enhanced. This also has the advantage that the slewing of the rear end of the coach is kept within the limits. This also has the advantage that an optimal manoeuvrability and steerability is realized for the coach.

In an embodiment of the invention, the ratio of the distance (A) between the front axle and the front end of the double-decker coach relative to the mutual distance (B) between the front axle (2) and the trailing axle (4) is between 0.10 and 0.50, preferably 0.25 and 0.40, more preferably 0.30 to 0.36, and most preferably approximately 0.33.

This has the advantage of increasing the road safety for the coach passengers and third parties, by virtue of an optimal ratio of the distance between the rearmost axle and the rear end of the coach and the mutual distance between the front axle (2) and the trailing axle (4). This also has the advantage that the comfort of the passengers is enhanced. This also has the advantage of an optimal ratio between the road-holding of the coach (1) and the occupancy of the coach.

The term "occupancy of the coach" in the present invention refers to the number of passengers (inclusive of the driver) that can be seated in the coach (1).

The term "front end of the double-decker coach" in the present invention refers to the foremost portion of the coach, excluding the front bumper.

In an embodiment of the invention, the ratio of the distance (D) between the front end of the double-decker coach (1) and the rear end of the double-decker coach (1) relative to the average width (E) of the double-decker coach (1) is between 4.00 and 6.00, preferably 4.75 and 5.50, more preferably 5.10 to 5.30, and most preferably approximately 5.23.

This has the advantage of increasing the road safety for the coach passengers and third parties, by virtue of an optimal ratio of the average width (E) and the distance (D). This also has the advantage that the comfort of the passengers is enhanced. This also has the advantage of an optimal ratio between the road-holding of the coach (1) and the occupancy of the coach. This also has the advantage that an optimal manoeuvrability and steerability is realized for the coach (1).

The term "rear end of the double-decker coach" in the present invention refers to the rearmost portion of the coach, excluding the towing hook.

In an embodiment of the invention the average width (E) of the double-decker coach (1) relative to the average height (F) of the double-decker coach (1) is between 0.50 and 0.80, preferably 0.55 and 0.75, more preferably 0.60 to 0.70, and most preferably approximately 0.65.

This has the advantage of increasing the road safety for the coach passengers and third parties, by virtue of an optimal ratio of the average width (E) and the average height (F). This also has the advantage that the comfort of the passengers is enhanced. This also has the advantage of an optimal ratio between the road-holding of the coach (1) and the occupancy of the coach. This also has the advantage that an optimal manoeuvrability and steerability is realized for the coach (1). This also has the advantage of a better stability of the coach (1).

The term "average height" in the present invention refers to the average height of the coach in an unloaden state.

In an embodiment of the invention, the distance (B1) between the front axle and said drive axle relative to the distance (B2) between said drive axle (3) and said trailing axle (4) is between 3.00 and 5.00, preferably 3.50 and 4.50, more preferably 4.10 to 4.30, and most preferably approximately 4.16.

This has the advantage of increasing the road safety for the coach passengers and third parties, by virtue of an optimal ratio of the distance (B1) and the distance (B2). This also has the advantage that the comfort of the passengers is enhanced. This also has the advantage of an optimal stability and road-holding of the coach (1).

In an embodiment of the invention, said pairs of wheels (8) of a said axle are disc-braked.

The term "disc-braked wheels" in the present invention refers to wheels wherein on the axle of the corresponding wheels one or more discs are provided, which rotate along with the wheels, and wherein, with the aid of brake blocks, the brake discs, and ditto wheels, are braked. This has the advantage that the comfort of the passengers is enhanced.

In an embodiment of the invention, the brake discs are operated by compressed-air cylinders. In contrast to hydraulic cylinders, this gives the advantage of passenger safety, for there is no risk of oil spills. This also gives a longer working life, since uniform pressures produce an even distribution of the braking between the left and right wheel of a corresponding axle.

In an embodiment of the invention, the wheels at each end of a said axle are independently suspended. The term "independently suspended" in the present invention refers to the two ends of an axle each having their own suspension, which can compress and decompress wholly independently from the opposite end of the axle.

This has the advantage that the damage to the road surface is limited. This also has the advantage that the comfort of the passengers is enhanced. This also has the advantage of better stability of the coach (1).

In a preferred embodiment of the invention, the wheels at each end of the trailing axle (4) are independently suspended.

It is very advantageous that the trailing axle (4) both is independently suspended and comprises two pairs of trailing wheels (8). In this combination, the two pairs of trailing wheels ensure a better weight distribution, which, together with the independent suspension, results in better safety and comfort for the passengers.

In an embodiment of the invention, said trailing axle (5) is forcibly steered. The term "forcibly steered" in the present invention refers to wheels that can be jointly steered, so that a shorter bend can be taken.

This has the advantage that an optimal manoeuvrability during travel and/or manoeuvring is realized for the coach (1). This also has the advantage that less tire wear occurs for said wheels.

In a preferential form of the invention, said trailing axle (5) is a follower axle.

The term "follower axle" in the present invention refers to an axle on which the wheels cannot be jointly steered.

This has the advantage that the coach (1) slews less and hence benefits the safety of third parties. This also has the advantage of a cheaper construction of the coach (1).

In an embodiment of the invention, said engine is substantially situated between the trailing axle (5) and the rear end of the double-decker coach (1).

In an embodiment of the invention, at least one said axle is provided with at least one pair of shock absorbers (60).

The term "shock absorber" in the present invention refers to a device which sits in the wheel suspension of the coach (1) in order to damp the effect of the springing. This has the advantage that the damage to the road surface is limited. This also has the advantage that the comfort of the passengers is enhanced. This also has the advantage of better road-holding of the coach (1). In addition, this also gives uniform wearing of the tires, thereby increasing the safety of the passengers.

In a preferred embodiment of the invention, at least one shock absorber (60) relates to a hydraulic cylinder.

In an embodiment of the invention, the suspension of the steerable wheels (6), the suspension of the left drive wheels (7a), the suspension of the right drive wheels (7b), the suspension of the left trailing wheels (8a) and the suspension of the right trailing wheels (8b) comprises one or more air bellows (10).

The term "air bellows" in the present invention refers to a device which is suitable for a springing based on pressurized air.

This has the advantage that the damage to the road surface is limited. This also has the advantage that the comfort of the passengers is enhanced. This also has the advantage that the coach (1) can carry a heavier load.

In a preferred embodiment of the invention, the suspension of the left trailing wheels (8a) and the suspension of the right trailing wheels (8b) comprises two air bellows (10). This has the advantage that the weight of the coach is better distributed, whereby the safety and comfort of the passengers is enhanced.

In a preferred embodiment of the invention, an air bellows is provided with a safety buffer to prevent implosion of the air bellows.

In a preferred embodiment of the invention, a first pressure-regulating device is provided for said air bellows (10) of said suspension of the steerable wheels (6), a second pressure-regulating device is provided for said air bellows (10) of the suspension of said left drive wheels (7a) and said left trailing wheels (8a), and a third pressure-regulating device is provided for said air bellows (10) of the suspension of said right drive wheels (7b) and said right trailing wheels (8b).

The term "pressure-regulating device" in the present invention refers to a device which is suitable for providing the connected air bellows with air at a specific pressure.

This has the advantage that the comfort of the passengers is enhanced, by virtue of the fact three independent pressure-regulating devices ensure better stability in dependence on the load distribution.

In a more preferred embodiment of the invention, said pressure-regulating devices are connected to a compressor, which provides said pressure-regulating devices with compressed air.

In a more preferred embodiment of the invention, at least one said pressure-regulating device is provided with a height-regulating valve.

The term "height-regulating valve" in the present invention refers to a device which is suitable for increasing the pressure in the connected air bellows if the driving height is too low and for lowering the pressure if the driving height is too high.

This has the advantage that a fixed driving height can be adjusted in the event of varying coach load and/or load distribution in the coach (1).

In a more preferred embodiment of the invention, each said pressure-regulating device is provided with a height-regulating valve.

This has the advantage that the driving height can be fixedly set in respect of different loads. This ensures that the air springing does not become too stiff with too little load and the coach (1) will not overly "sag" with too much load. This hence gives a more stable and safer coach (1) and, at the same time, more comfort for the passengers. This also has the advantage that, in the event of an unequal load distribution in the coach (1), the driving height at the front, at the back left and at the back right of the coach (1) can be regulated independently. This results in an even more stable and safer coach (1) and more comfort for the passengers. This has the advantage that a fixed driving height can be set at the front, back left and back right in the coach (1), so that, in the event of varying coach load or varying load distribution in the coach (1), this offers better comfort to the passengers.

In a more preferred embodiment of the invention, the ratio of the effective air bellows working surface of the air bellows (10) of the suspension of the drive wheels (7) relative to the effective air bellows working surface of the air bellows (10) of the suspension of the trailing wheels (8) is between 1.01 and 40, preferably 1.05 and 10.0, more preferably 1.10 to 5.00, and most preferably approximately 1.17.

The term "effective air bellows working surface" in the present invention refers to that surface within an air bellows on which the air can act or press, wherein the surface is fixedly mounted relative to the frame (9).

This has the advantage of an improved grip on the road. If there is too little grip on the road (for example slipperiness as a result of ice, mud, . . . ) on at least one side on the rear side of the coach (1), the pressure can be raised in the air bellows of the drive and trailing wheels on the corresponding side. As a result of the larger combined effective working surface for the air bellows for the drive wheels on one well-defined side relative to the combined effective working surface for the air bellows for the trailing wheels, the load upon the drive wheels increases, whereby a better grip on the road is obtained. This hence has the advantage of increasing the road safety for the coach passengers and third parties, of enhancing the comfort of the passengers and also of providing optimal manoeuvrability and steerability for the coach.

Unless defined otherwise, all terms which are used in the description of the invention, including technical and scientific terms, have the meaning by which they are commonly understood by the person skilled in the art within the technical field of the invention.

In the following, the invention is described on the basis of non-limiting examples which illustrate the invention, and which are not intended or should not be interpreted to limit the scope of the invention.

It is presumed that the present invention is not limited to the embodiments which are described above and that some modifications or changes can be added to the described examples without revaluation of the appended claims.

EXAMPLES

Example 1

Embodiment for a Double-Decker Coach (1) According to the Invention

FIG. 1 shows a side view and a top view of the chassis of the double-decker coach (1), according to a first aspect of the invention. The double-decker coach (1) comprises:
- a frame (9);
- an engine (5);
- a front axle (2), which lies transversely to the principal axis of said frame (9) and which offers support to the aforesaid frame (9), wherein said front axle (2) comprises a pair of steerable wheels (6), which lie mounted on bearings and wherein said pair of wheels (6) can be steered by a driver;
- a tandem rear axle, which lies transversely to the longitudinal direction of said frame, which is mounted parallel to said front axle (2) and which offers support to the aforesaid frame (9), and wherein said tandem rear axle comprises a drive axle (3) and a trailing axle (4), wherein the drive axle (3) comprises two pairs of drive wheels (7), wherein said drive axle (3) is coupled to said engine (5), and wherein the trailing axle (4), which is mounted parallel to the drive axle (3), comprises two pairs of trailing wheels (8), wherein the ratio of the distance (C) between the third axle and the rear end of the double-decker coach (1) relative to the mutual distance (B) between the front axle and the trailing axle (4) is between 0.2 and 0.5, preferably 0.25 and 0.45, more preferably 0.35 to 0.42, and most preferably approximately 0.39.

Figure 2:
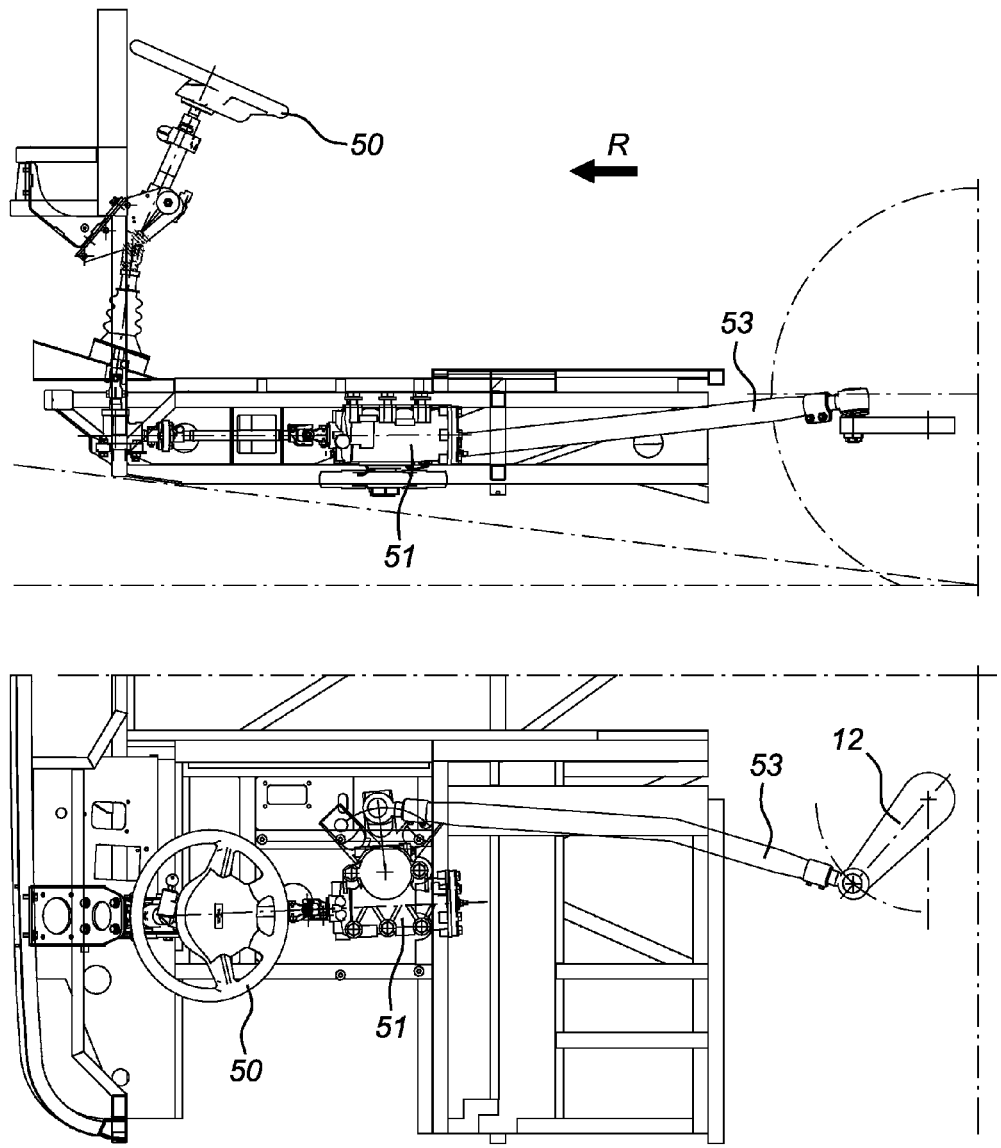

FIG. 1 shows the various distances (A), (B), (B1), (B2) and (C). The direction of travel (R) is also represented. The engine (5) is situated between the trailing axle (5) and the rear end of the double-decker coach (1). The drive axle (3) comprises one pair of left drive wheels (7a) and one pair of right drive wheels (7b). The trailing axle (4) comprises one pair of left trailing wheels (8a) and one pair of right trailing wheels (8b). The steering wheel (50) is situated at the front of the coach, which is connected to the steering housing (51) which, via the steering rod (53), can turn the steerable wheels (6). FIG. 2 shows a side and top view of the steering system, comprising the steering wheel (50), the steering housing (51) and the steering rod (53).

Figure 3:
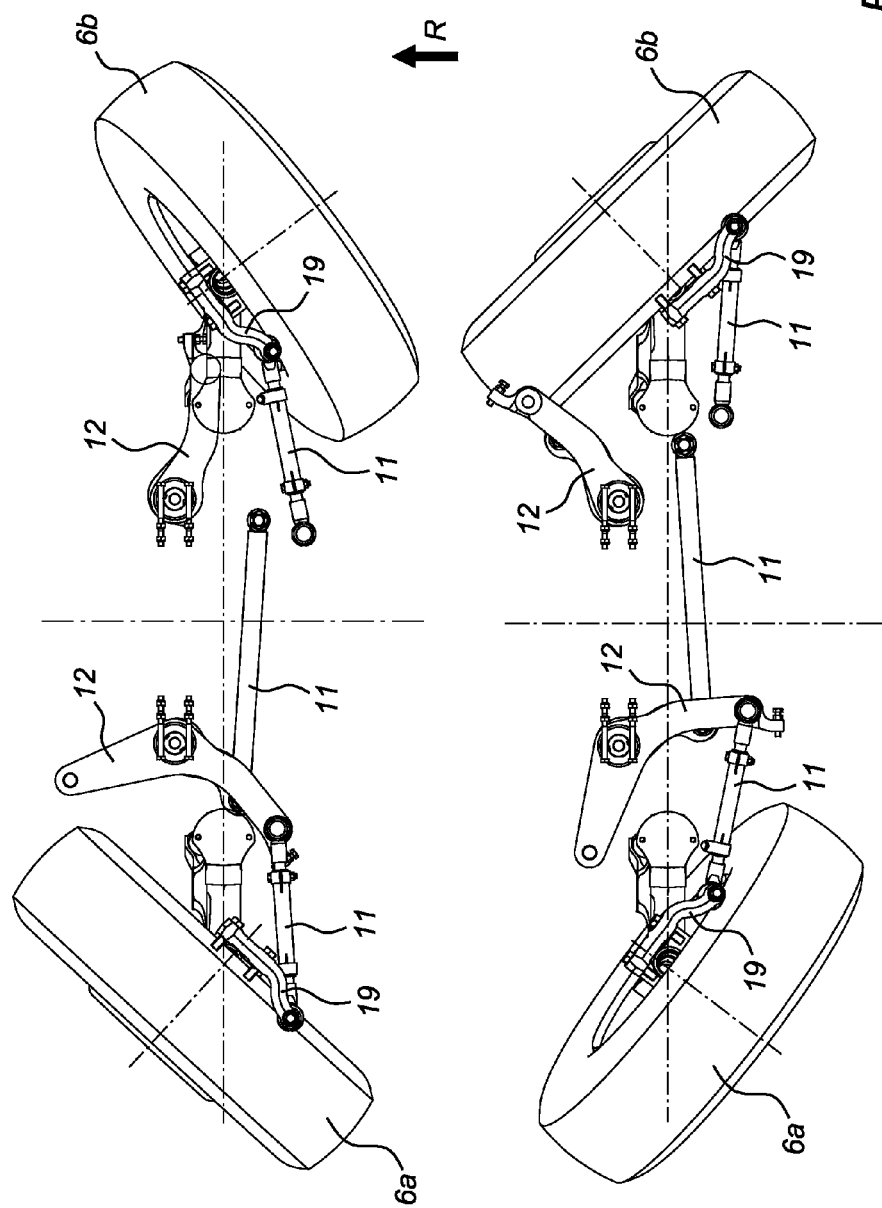

The steering rod (53) is connected to the steering rocker (12). FIG. 3 shows a top view of, on the one hand, the front axle (2) with the steerable wheels (6, 6a, 6b) turned maximally to the right and, on the other hand, the front axle (2) with the steerable wheels (6, 6a, 6b) turned maximally to the left. The position of the track rods (11) and steering rockers (12) preferably ensures a turning angle between 38° and 48°, more preferably between 42° and 46°, most preferably 43.6° for the steerable wheel (6, 6a, 6b) in the inside bend, and preferably a turning angle between 30° and 42°, more preferably between 35° and 39°, most preferably 36.8° for the steerable wheel (6, 6a, 6b) in the outside bend.

Figure 4:
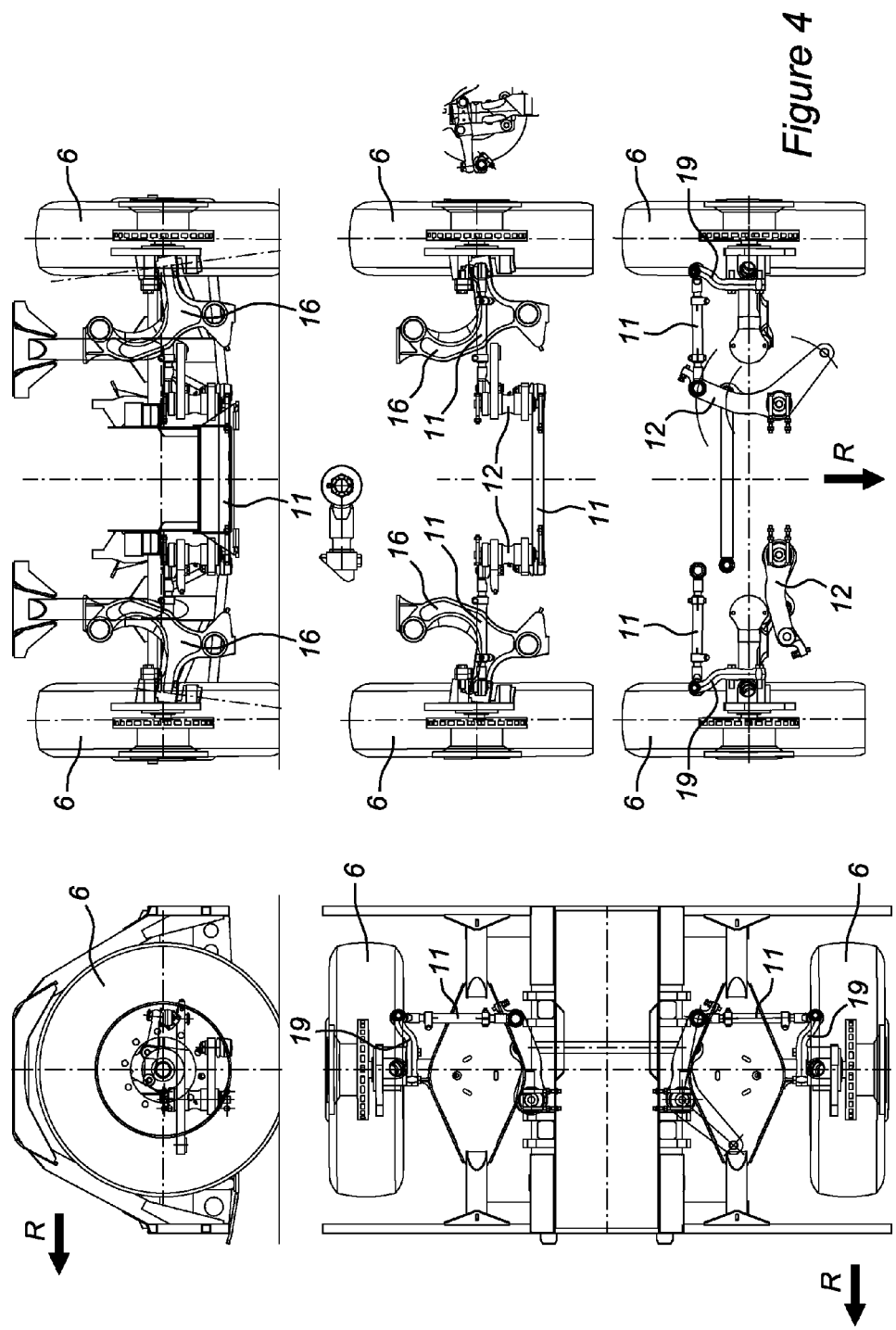

FIG. 4 shows some front views, top views and a side view of possible positions of the track arms (19), track rods (11) and steering rockers (12) of the front axle (2).

Figure 5:
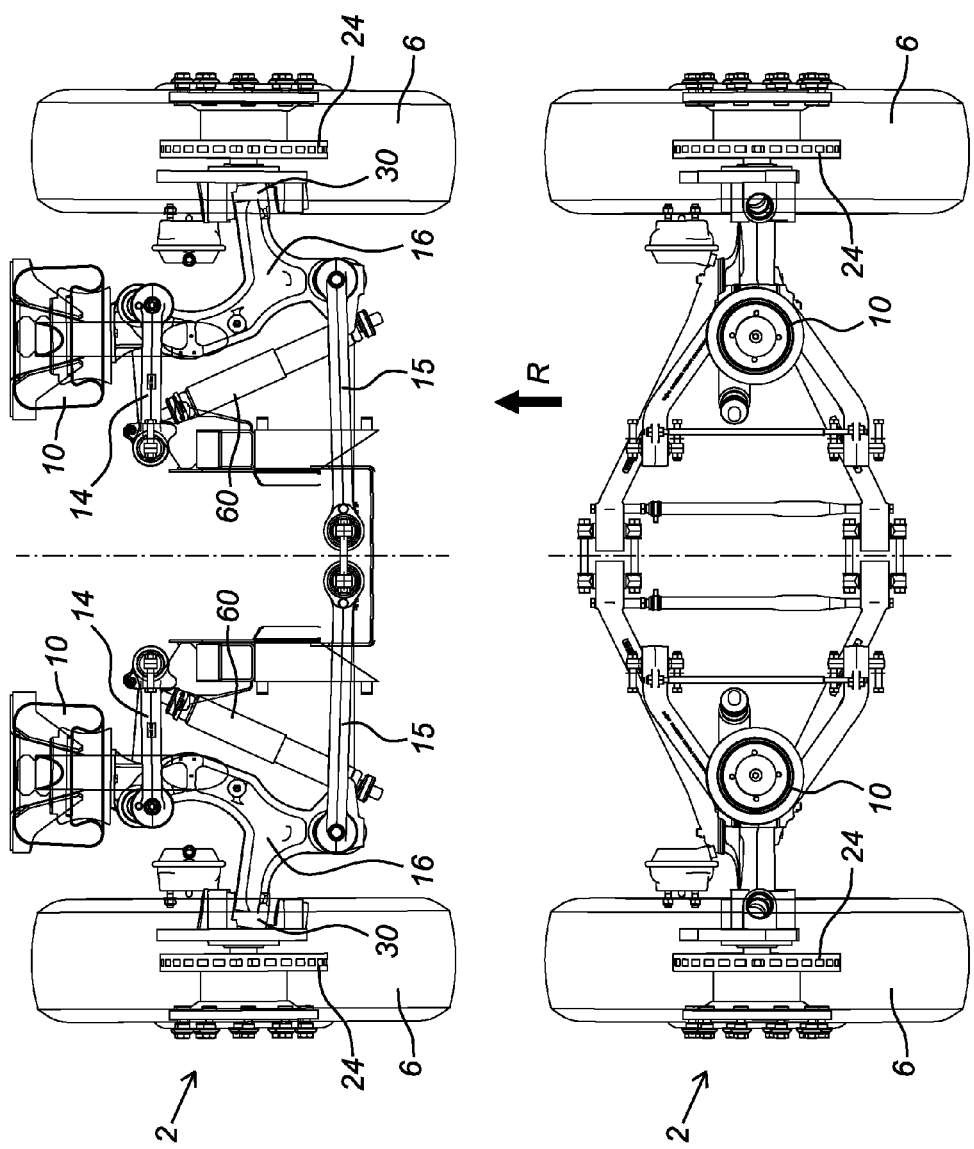

FIG. 5 shows a front view and a top view of the suspension of the front axle (2). This suspension comprises 2 air bellows (10) and 2 shock absorbers (60), together with the topmost supporting arms (14), bottommost supporting arms (15) and the air bellows carriers (16). The steerable wheels (6) are provided with a brake disc (24) and brake blocks. The front axle (2) is thus disc-braked. A steerable wheel (6) is connected by the king pin (31) to the axle stub (30) on the air bellows carrier (16).

Figure 6:
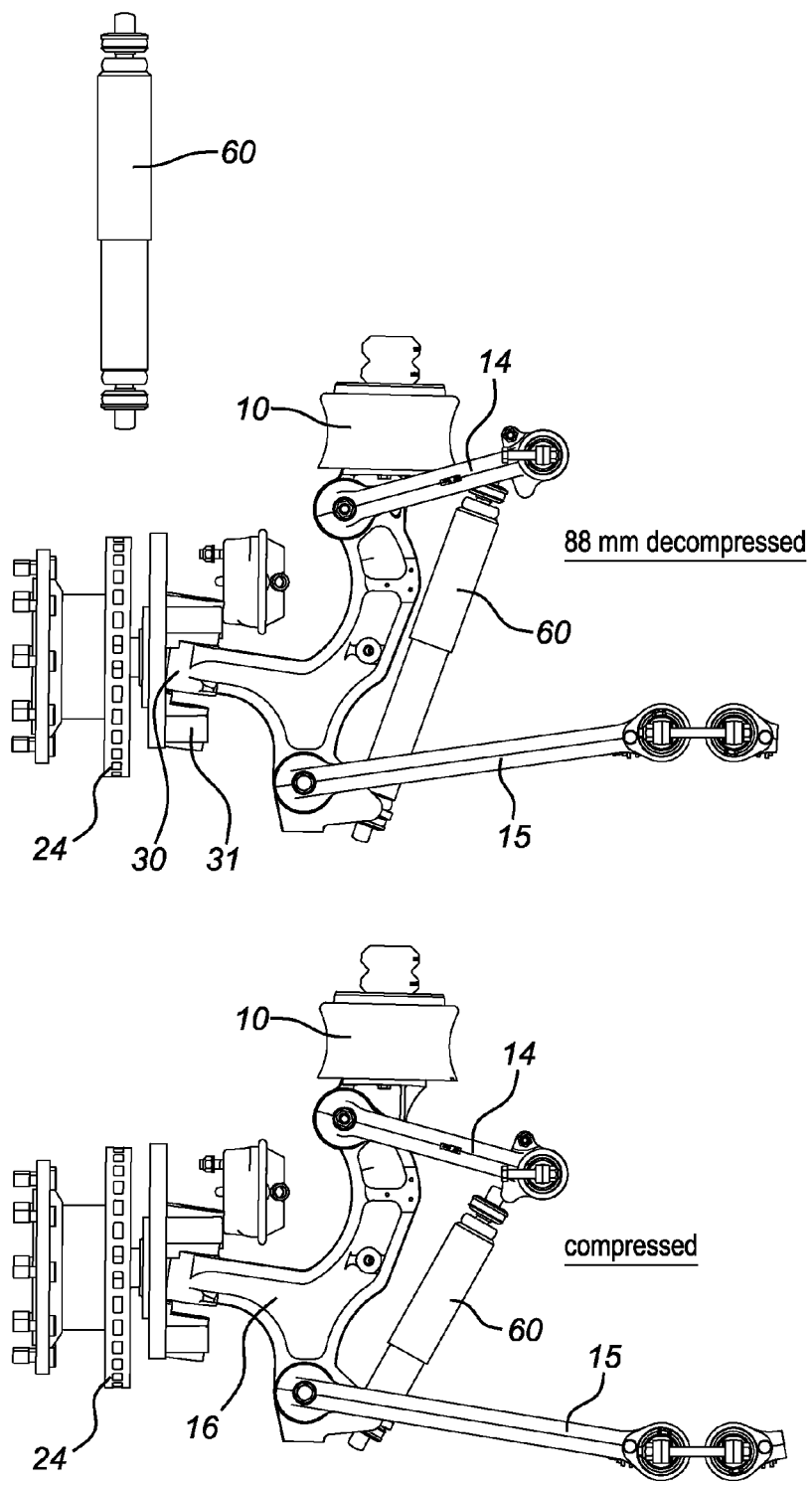

FIG. 6 shows a front view of a section of the front axle (2), wherein this, on the one hand, is decompressed and, on the other hand, is compressed. Here the brake disc (24), the king pin (31) and the axle stub (30) are also represented.

Figure 7:
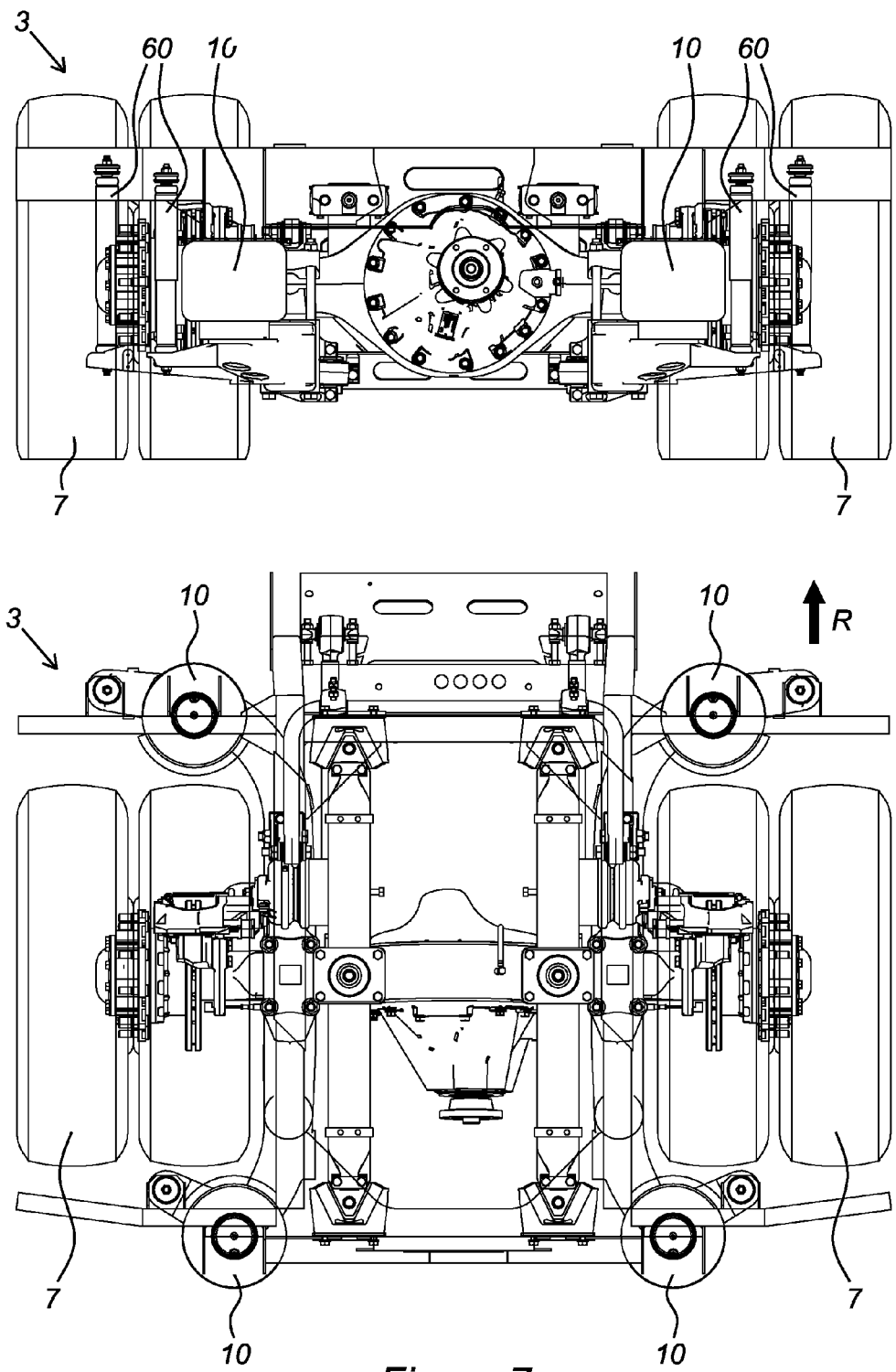

FIG. 7 shows a rear view and a top view of the drive axle (3). Just like the steerable wheels (6), the drive wheels (7) are provided with a brake disc (24) and brake blocks. The drive axle (2) is thus disc-braked.

Figure 8:
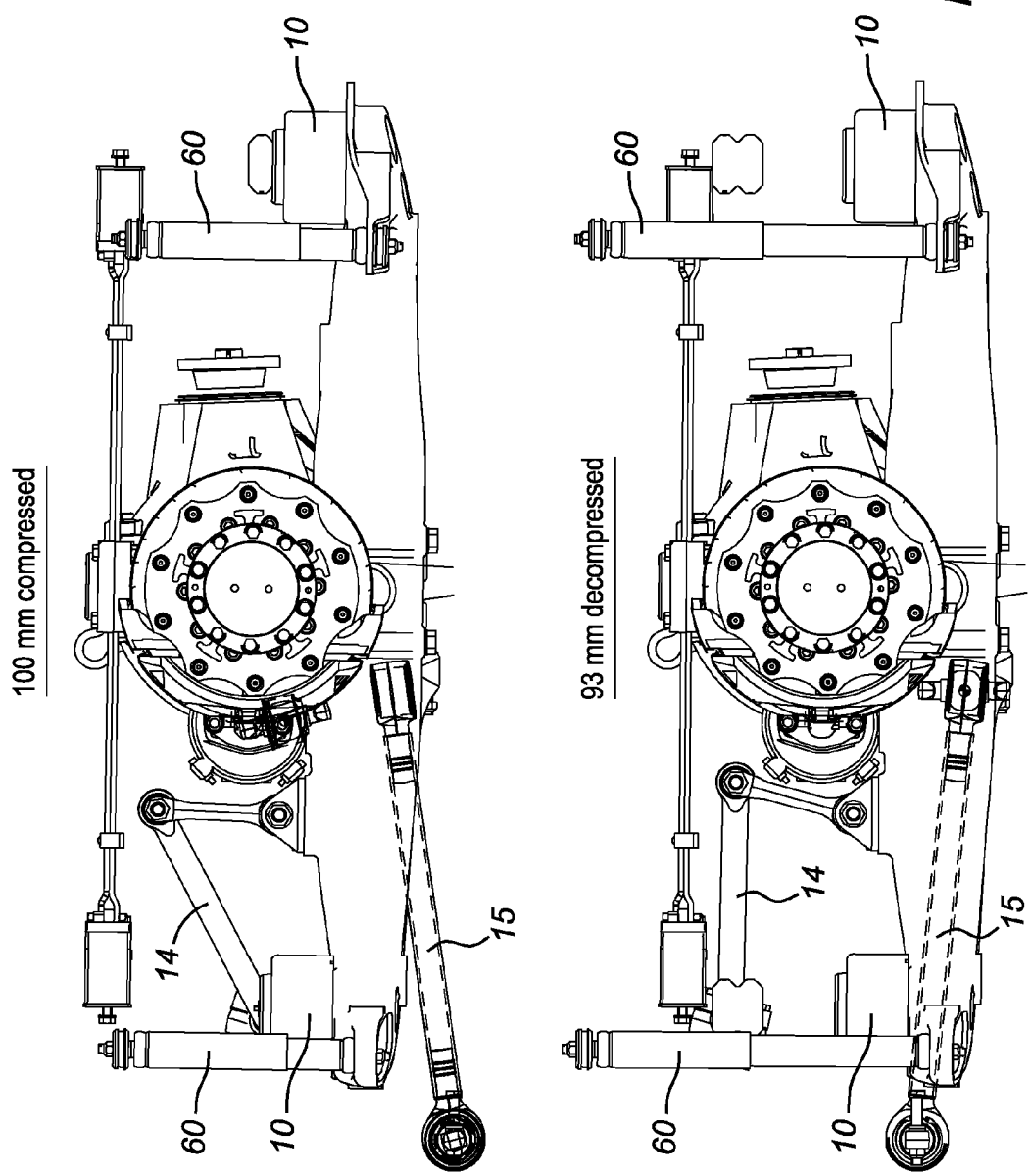

FIG. 8 shows a rear view of a section of the drive axle (3), wherein this, on the one hand, is compressed and, on the other hand, is decompressed. The suspension for the drive axle comprises 4 air bellows (10) and 4 shock absorbers (60), together with a topmost supporting arm (14) and bottommost supporting arm (15). Note that the curve of the topmost leaf spring is not included.

Figure 9:
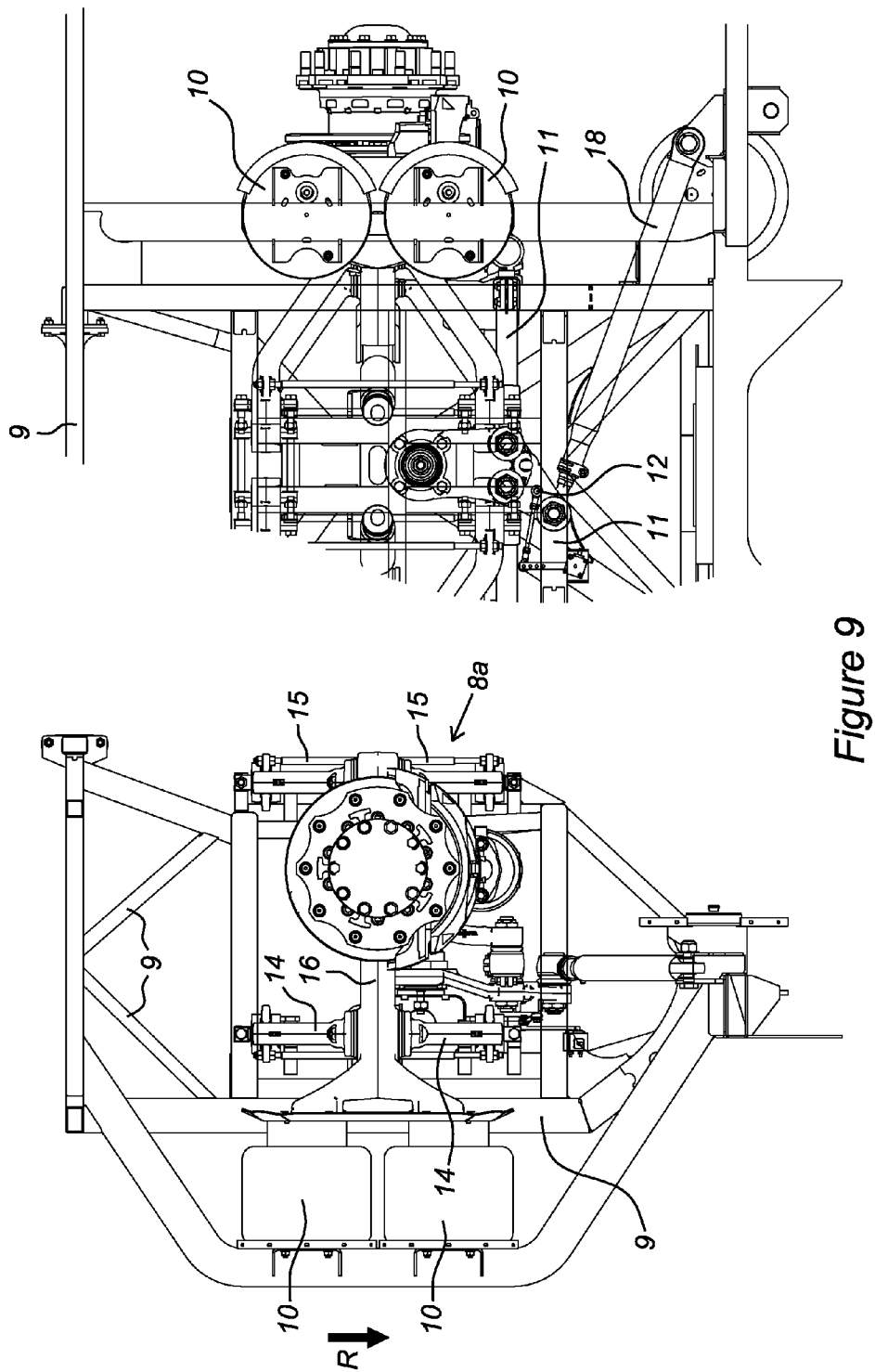

FIG. 9 shows a side view and a top view of the trailing axle (4). In the middle of the trailing axle (4) and in the longitudinal direction of the coach (1), space is provided for the cardan shaft, which connects the drive axle (3) to the engine (5). Just like the steerable wheels (6), the trailing wheels (7) are provided with a brake disc (24) and brake blocks. The trailing axle (2) is thus disc-braked. The suspension comprises 4 air bellows (10) and 2 shock absorbers (60), together with the topmost supporting arms (14), bottommost supporting arms (15) and the air bellows carriers (16). The fixed rod (18) together with the track arms (19), track rods (11) and steering rockers (12) of the trailing axle (2). The trailing axle is hence a follower axle. In another embodiment, the fixed rod (18) is replaced by a control cylinder (13), which is suitable for controlling the trailing axle.

Figure 10:
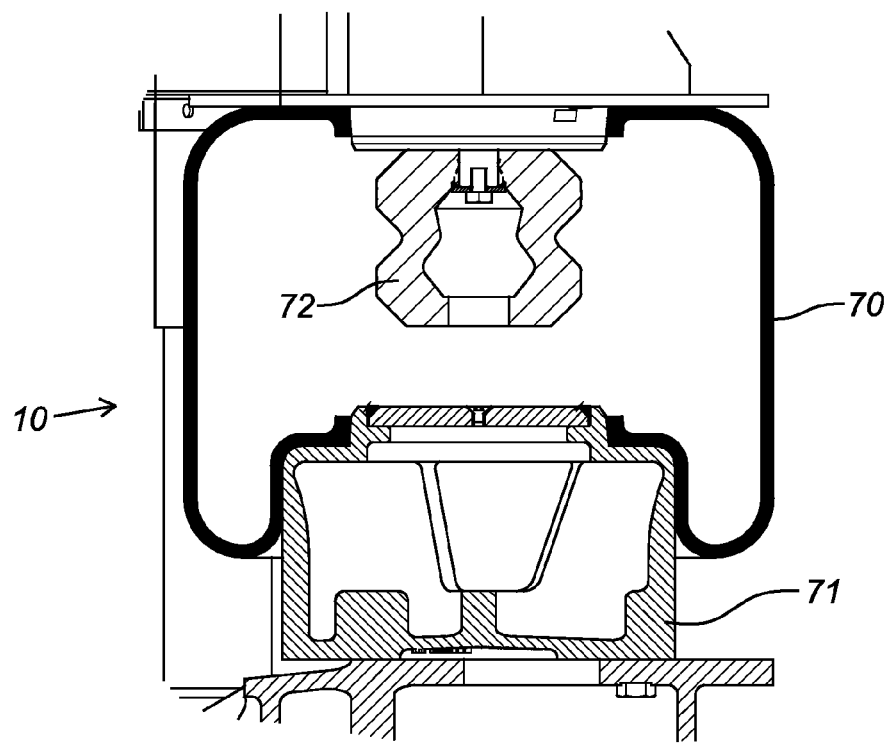

FIG. 10 shows a cross-sectional view of an air bellows (10), comprising a deformable section (70), an air bellows piston (71) and an air bellows buffer (72).

Figure 11:
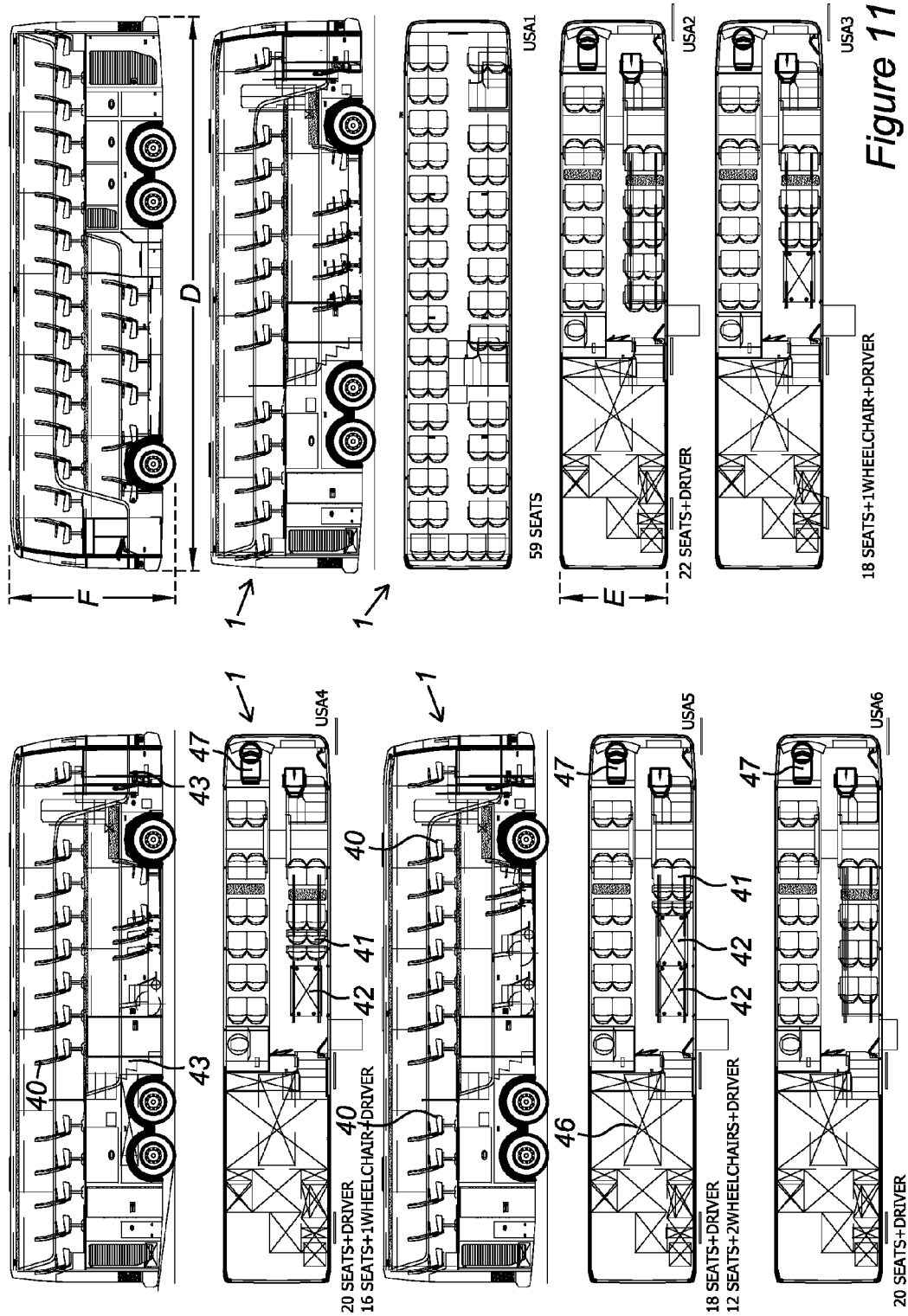

FIG. 11 shows side views and top views of various possible configurations of the double-decker coach. In addition to the various seating options, the position of a luggage space (44) and the fuel tank (46) is also represented.

In a preferred embodiment of the invention, the topmost compartment of the coach (1) comprises 59 fixed seats (40).

In a preferred embodiment of the invention, the bottommost compartment of the coach (1) comprises 22 fixed seats (40) and 1 driver's seat (47).

In another preferred embodiment of the invention, the bottommost compartment of the coach (1) comprises 16 fixed seats (40), 1 wheelchair attachment point (42), 6 displaceable seats (41) on rails and 1 driver's seat (47).

In another preferred embodiment of the invention, the bottommost compartment of the coach (1) comprises 12 fixed seats (40), 2 wheelchair attachment points (42), 6 displaceable seats (41) on rails and 1 driver's seat (47).

In another preferred preferential form of the invention, the coach (1) is provided with a kitchen (45).

REFERENCES IN THE FIGURES double-decker coach (1)
front axle (2)
drive axle (3)

trailing axle (4)
engine (5)
steerable wheel (6)
left steerable wheel (6a)
right steerable wheel (6b)
drive wheel (7)
left drive wheel (7a)
right drive wheel (7b)
trailing wheel (8)
left trailing wheel (8a)
right trailing wheel (8b)
chassis frame (9)
air bellows (10)
track rod (11)
steering rocker (12)
control cylinder (13)
topmost supporting arm (14)
bottommost supporting arm (15)
air bellows carrier (16)
fixed rod (18)
track arm (19)
brake block (22)
brake disc (24)
axle stub (30)
king pin (31)
fixed seat (40)
displaceable seat (41) on rails
wheel chair attachment point (42)
stairway (43)
luggage space (44)
kitchen (45)
fuel tank (46)
steering wheel (50)
steering housing (51)
shock absorber (60)
the distance (A) between the front axle (2) and the front end of the double-decker coach (1)
the distance (B) between the front axle (2) and the trailing axle (4)
the distance (B1) between the front axle (2) and the drive axle (3)
the distance (B2) between the drive axle (3) and the trailing axle (4)
the distance (C) between the trailing axle (4) and the rear end of the double-decker coach (1)
the distance (D) between the front end of the double-decker coach (1) and the rear end of the double-decker coach (1)
the average width (E) of the double-decker coach (1)
the average height (F) of the double-decker coach (1)
direction of travel (R)

What is claimed is:

1. Double-decker coach comprising:
a frame;
an engine;
a front axle, which lies transversely to the principal axis of said frame and which offers support to the aforesaid frame, wherein said front axle comprises a pair of steerable wheels, which lie mounted on bearings, and wherein said pair of wheels can be steered by a driver;
a tandem rear axle, which lies transversely to the longitudinal direction of said frame, which is mounted parallel to said front axle and which offers support to the aforesaid frame, and wherein said tandem rear axle comprises a drive axle and a trailing axle, wherein the drive axle comprises two pairs of drive wheels, wherein said drive axle is coupled to said engine, and wherein the trailing axle, which is mounted parallel to the drive axle, comprises two pairs of trailing wheels, wherein the ratio of the distance (C) between the third axle and the rear end of the double-decker coach relative to the mutual distance (B) between the front axle and the trailing axle is between 0.20 and 0.50,
wherein the suspension of the steerable wheels, the suspension of the left drive wheels, the suspension of the right drive wheels, the suspension of the left trailing wheels and the suspension of the right training wheels comprises one or more air bellows and wherein a first pressure-regulating device is provided for said air bellows of said suspension of the steerable wheels, in that a second pressure-regulating device is provided for said air bellows of the suspension of said left drive wheels and said left trailing wheels, and in that a third pressure-regulating device is provided for said air bellows of the suspension of said right drive wheels and said right trailing wheels.

2. Device according to claim 1, wherein the ratio of the distance (A) between the front axle and the front end of the double-decker coach relative to the mutual distance (B) between the front axle and the trailing axle is between 0.10 and 0.50.

3. Device according to claim 2, wherein the ratio of the distance (D) between the front end of the double-decker coach and the rear end of the double-decker coach relative to the average width (E) of the double-decker coach is between 4.00 and 6.00.

4. Device according to claim 1, wherein the average width (E) of the double-decker coach relative to the average height (F) of the double-decker coach is between 0.50 and 0.80.

5. Device according to claim 1, wherein the distance (B1) between the front axle and said drive axle relative to the distance (B2) between said drive axle and said trailing axle is between 3.00 and 5.00.

6. Device according to claim 1, wherein said pairs of wheels of a said axle are disc-braked.

7. Device according to claim 1, wherein the wheels at each end of a said axle are independently suspended.

8. Device according to claim 1, wherein said trailing axle is forcibly steered.

9. Device according to claim 1, wherein said trailing axle is a follower axle.

10. Device according to claim 1, wherein said engine is substantially situated between the trailing axle and the rear end of the double-decker coach.

11. Device according to claim 1, wherein at least one said axle is provided with at least one pair of shock absorbers.

12. Device according to claim 1, wherein at least one said pressure-regulating device is provided with a height-regulating valve.

13. Device according to claim 1, wherein each said pressure-regulating device is provided with a height-regulating valve.

14. Device according to claim 1, wherein the ratio of the effective air bellows working surface of the air bellows of the suspension of the drive wheels relative to the effective air bellows working surface of the air bellows of the suspension of the trailing wheels is between 1.01 and 40.0.

15. Device according to claim 1, wherein the suspension of the left trailing wheels and the suspension of the right trailing wheels comprises two air bellows.

* * * * *

UNITED STATES PATENT AND TRADEMARK OFFICE
CERTIFICATE OF CORRECTION

PATENT NO.         : 8,840,123 B2                       Page 1 of 1
APPLICATION NO.    : 14/016595
DATED              : September 23, 2014
INVENTOR(S)        : Heli Boterdaele et al.

It is certified that error appears in the above-identified patent and that said Letters Patent is hereby corrected as shown below:

In the Specification,

In column 2 at line 22 (approx.), Change "hand" to --hand.--.

In column 4 at line 22, Change "unloaden" to --unloaded--.

In column 9 at line 50 (approx.), Change "travel (R)" to --travel (R).--.

In the Claims,

In column 10 at line 11 (approx.), In Claim 1, change "training" to --trailing--.

Signed and Sealed this
Thirty-first Day of March, 2015

Michelle K. Lee
*Director of the United States Patent and Trademark Office*